United States Patent [19]
Click, Jr.

[11] Patent Number: 6,059,840
[45] Date of Patent: May 9, 2000

[54] AUTOMATIC SCHEDULING OF INSTRUCTIONS TO REDUCE CODE SIZE

[75] Inventor: Cliff N. Click, Jr., Austin, Tex.

[73] Assignee: Motorola, Inc., Schaumburg, Ill.

[21] Appl. No.: 08/819,382

[22] Filed: Mar. 17, 1997

[51] Int. Cl.[7] .................................................. G06F 9/45
[52] U.S. Cl. ................................................. 717/9; 717/8
[58] Field of Search .................................. 395/709, 708

[56] References Cited

U.S. PATENT DOCUMENTS

| | | | |
|---|---|---|---|
| 4,571,678 | 2/1986 | Chaitin | 395/707 |
| 5,367,651 | 11/1994 | Smith et al. | 395/709 |
| 5,367,696 | 11/1994 | Abe | 395/705 |
| 5,396,631 | 3/1995 | Hayashi et al. | 395/707 |
| 5,491,823 | 2/1996 | Ruttenberg | 395/709 |
| 5,530,866 | 6/1996 | Koblenz et al. | 395/708 |
| 5,761,514 | 6/1998 | Aizikowitz et al. | 395/709 |
| 5,784,066 | 7/1998 | Aizikowitz et al. | 345/440 |
| 5,790,866 | 8/1998 | Robison | 395/709 |
| 5,790,867 | 7/1998 | Schmidt et al. | 395/709 |
| 5,835,776 | 11/1998 | Tirumalai et al. | 395/709 |
| 5,878,261 | 3/1999 | Holler et al. | 395/709 |
| 5,901,317 | 5/1999 | Geobel | 395/709 |
| 5,903,761 | 5/1999 | Tyma | 395/709 |
| 5,923,883 | 7/1999 | Tanaka et al. | 395/709 |
| 5,930,507 | 7/1999 | Nakahira et al. | 395/705 |
| 5,937,196 | 8/1999 | Schmidt et al. | 395/709 |
| 5,940,621 | 8/1999 | Caldwell | 395/709 |

OTHER PUBLICATIONS

Park, J.; Moon, S.–M.; "Optimistic Register Coalescing"; Proceedings of the 1998 International Conference on Parallel Architectures and Compilation Techniques; pp. 196–204, Oct. 1998.

George, L.; Appel, A.; "Iterated Register Coalescing"; ACM Transactions on Programming Languages and Systems; vol. 18, No. 3, pp. 300–324, Mar. 1996.

Chow, F.; "Minimizing Register Usage Penalty at Procedure Calls"; Proceedings of the SIGPLAN '88 Conference on Programming Language Design and Implementation; pp. 85–94, Jun. 1998.

Alfred V. Aho, Ravi Sethi and Jeffrey D. Ullman "Compilers Principles, Techniques,and Tools", Addison–Wesley Chapter 10, Mar. 1988.

Gregory J. Chaitin, et al, "Register Allocation Via Coloring", IBM T. J. Watson Research Center, RC 8395 (#36543) Aug. 4, 1980, Computer Science, pp. 1–12.

Frederick Chow, et al., "Register Allocation by Priority–based Coloring", Proceedings of the ACM SIGPLAN '84 Symposium on Compiler Construction SIGPLAN Notices, vol. 19,No. 6, Jun. 1984, pp. 222–232.

Preston Briggs, Dissertation "Register Allocation via Graph Coloring", Rice University, Houston, Texas, Apr. 1992, pp. 1–142.

Monica Lam, "Software Pipelining: An Effective Scheduling Techique for VLIW Machines", Proceedings of SIGPLAN '88 Conf. on Programming Language Design/Implementation, Atlanta, GA, Jun. 22–24, 1988, pp. 318–327.

Phillip B. Gibbons, et al., "Efficient Instruction Scheduling for a Pipelined Architecture", Proceedings of SIGPLAN '88 Conf. on Compiler Construction SIGPLAN Notices 21(7), Jul.,1988,pp. 1–3.

(List continued on next page.)

*Primary Examiner*—Tariq R. Hafiz
*Assistant Examiner*—Brian Sattizahn

[57] ABSTRACT

Scheduling instructions by eliminating COPY instructions to reduce code size and increase performance in a computer program compiler. According to one embodiment of the present invention COPY instructions are coalesced prior to preparing a ready list. The ready list is polled and instructions selected for scheduling. After selection of a next instruction, liveness conflicts are determined, where a live register contains a valid value that is needed at a later step. Conflicts are then resolved and instruction scheduling continues. The process is continued until the ready list is empty.

19 Claims, 4 Drawing Sheets

OTHER PUBLICATIONS

John Hennessy, et al., "Postpass Code Optimization of Pipeline Constraints", ACM Transaction on Programming Languages and Systems, vol. 5, No. 3, Jul. 1983, pp. 422–448.

Joseph A. Fisher, "Trace Scheduling: A Technique for Global Microcode Compaction", IEEE Transactions on Computers, vol. C–30., No. 7, Jul. 1981, pp. 478–490.

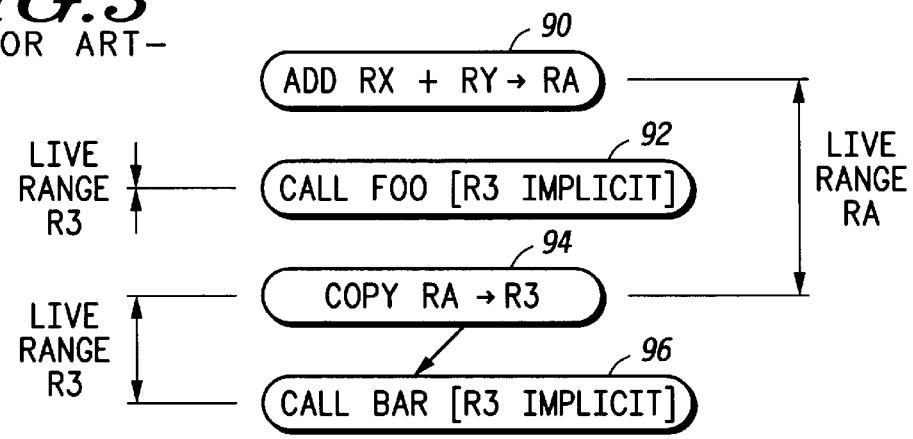
FIG.3 -PRIOR ART-
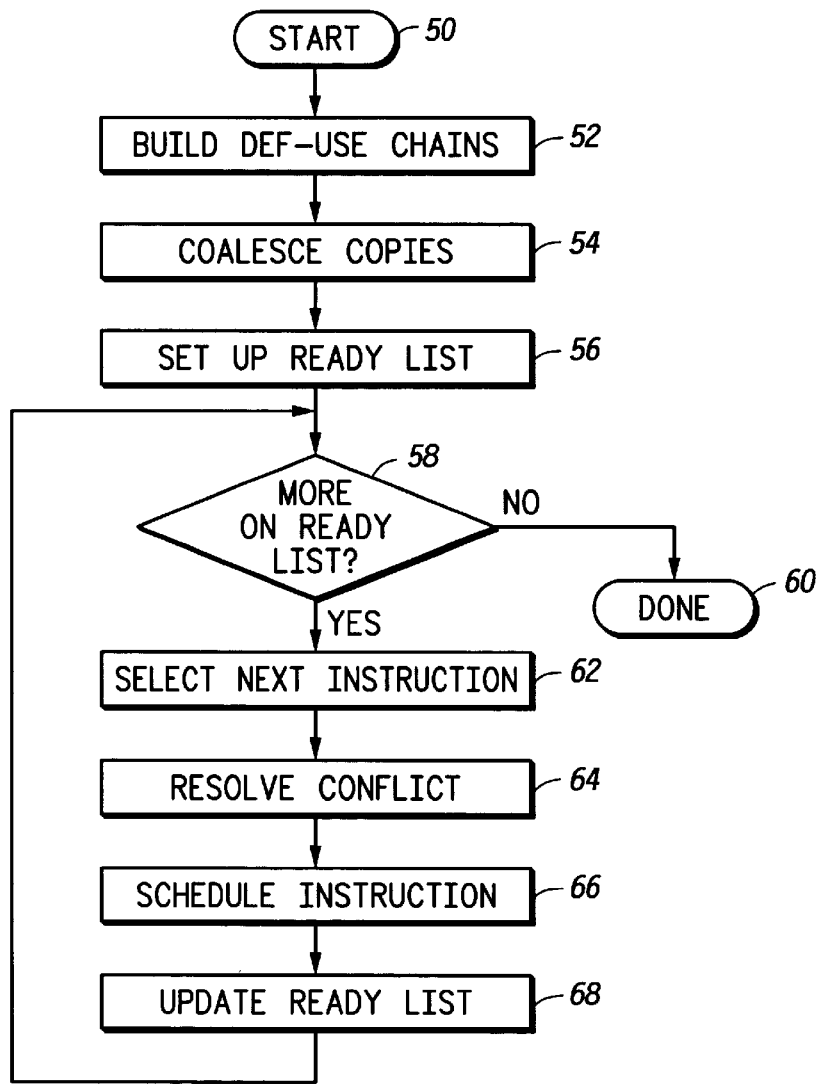
FIG.4

AUTOMATIC SCHEDULING OF INSTRUCTIONS TO REDUCE CODE SIZE

FIELD OF THE INVENTION

The present invention relates to computer language compiler methods, and more particularly to optimization of resultant performance.

BACKGROUND OF THE INVENTION

Scheduling, or instruction rearrangement, has long been a part of optimizing code. It typically involves rearranging instruction order to increase processor performance. Scheduling has the secondary effect of altering which registers can be used without changing the program behavior. Calling conventions require values to be in specific registers. If the instruction that produces a subroutine parameter cannot write directly to the required register, a COPY instruction is needed just prior to the subroutine call. This COPY instruction increases code size and therefore decreases performance. Scheduling can move the defining instruction to just prior to the subroutine, produce the result directly in the required register and avoid the COPY instruction.

Note that expected savings do not come from avoiding the execution of the COPY instruction. This is because a COPY instruction itself uses few CPU resources. Most modern CPUs can issue two integer operations per cycle and the COPY instruction will only have a one-cycle latency. Further, the COPY instruction's one input will have executed many cycles previously (as there has to be an intervening subroutine call or the required register will be legal and the COPY instruction can be avoided).

For larger integer-intensive codes like operating systems, data bases, compilers, and complex GUIs, subroutine calls are a large part of the static instruction count for these programs. For example, with respect to many such large integer-intensive codes, about 10% of the static instruction count for these codes will be COPY instructions. The large number of COPY instructions generated uses valuable space in the instruction cache. This in turn causes I-cache misses which are very expensive. Some of these generated COPY instructions can be avoided by rescheduling.

Scheduling has a long history with much research. This research has been focused on raw performance, generally considering only instruction latency and available parallelism (i.e., superscalar or VLIW). Simplifying assumptions utilized during scheduling include assuming all instructions are in I-cache and that subroutine calls are not that interesting. This later is because subroutine calls typically contain far more work than is being saved by good scheduling in the one block containing the call. Coalescing COPY instructions has not been a focus of this work.

COPY instruction coalescing has typically been done either as a separate compiler pass (called Copy Propagation or Copy Forwarding) or as part of the register allocater in a compiler. Both of these techniques attempt to change any registers defined by a COPY instruction to be the same registers that the COPY instruction is using. If successful, the COPY instruction will move a register onto itself, and can be easily removed. These techniques are global since they can change register assignments across a whole program. However, these techniques do not reorder instructions. If a value is defined before a subroutine CALL, is required in a specific register after the subroutine is entered, and the subroutine "clobbers" that register, then these techniques will require a COPY instruction. This invention attempts to move defining instructions past subroutine CALLs so that their values can be defined directly into the required registers. FIG. 3 below is an example of a COPY instruction that cannot be removed by prior art, but can be removed by this invention.

FIGS. 1 and 2 are dataflow charts used to illustrate COPY instruction elimination and Register Allocation techniques for eliminating COPY instructions. FIG. 1 is an example where COPY Propagation can successfully remove a COPY instruction. Instruction 70 defines register RA. In the example, an ADD instruction is shown as instruction 70. However, this technique works with any instruction that defines register RA. Instruction 72 copies register RA to register RB. Instruction 74 utilizes register RB. In this instance, an ADD instruction is shown as instruction 74 that adds register RB to another register. However, this technique works other instructions than ADD instructions.

COPY elimination operates by looking at a COPY instruction such as shown in instruction 72, and determining whether the source register in COPY instruction 72 is clobbered between instruction 72 and the instruction that uses the COPY instruction result in instruction 74. In the example in FIG. 1, register RA is not clobbered between instruction 72 where it is copied to register RB, and instruction 74 where register RB is utilized. In this example, there is no other use for register RB, and COPY instruction 72 therefore becomes unused. Unused or "Dead" COPY instructions can therefore be eliminated. The resulting code is shown on the right hand side of FIG. 1, where instruction 70 stays the same, generating an output value in register RA. Instruction 74 is modified to replace register RB with register RA resulting in instruction 76. COPY instruction 72 has been eliminated.

Register Allocation generates the same results as COPY instruction elimination in this example, but with a different algorithm. This technique looks for a "live range" for register RA, and a live range for register RB. If the live ranges for register RA and register RB do not interfere, then the two registers can be coalesced. Thus, in the FIG. 1 example, the live range of register RA is between instruction 70 and instruction 72, and the live range of register RB is between instruction 72 and instruction 74. Since there is no interference between the two live ranges, the registers can be coalesced, and the COPY instruction 72 can be eliminated.

The way that COPY instruction coalescing works is that a single combined register RAB is created, replacing registers RA and RB. This turns COPY instruction 72 into a COPY of register RAB into itself, which can be easily eliminated.

FIG. 2 is an example where a COPY Propagation in a forward direction fails to eliminate COPY instructions, but Register Allocation does remove COPY instructions. Register RA is defined in instruction 80. In this example, an ADD instruction is shown, wherein the result is placed in register RA. However, this technique works with other instructions. The resulting value in register RA is copied to register R3 in instruction 82. This resulting value in register R3 is utilized in the call to subroutine FOO in instruction 84. Note that the use of register R3 is implicit here. Whenever subroutine CALLs are generated by higher level language compilers, calling conventions are used. These conventions dictate what registers are used to communicate between the calling and called routines, and what registers are clobbered by the called routine.

In this example, COPY Propagation fails because resulting register RB in FIG. 1 cannot be renamed. This is because register R3 is fixed by the calling convention. In this instance, R3 is shown, since this is part of the PowerPC™ calling convention. However, other computer architectures utilize other calling conventions. COPY elimination fails here because it cannot rename register R3 to register RA, due to the calling convention. Note, that COPY Propagation has been shown, which works in the forward direction. Whereas in this example COPY Propagation operating in the backward direction would eliminate the COPY instruction by defining RA instruction in instruction 80 to be R3, a similar counter example is easily generated that fails in the backward direction.

Register Allocation is similar in operation to that shown in FIG. 1. A live range for register RA is identified between instructions 80 and 82. Likewise, a live range is identified for register R3 between instructions 82 and 84. Since the two live ranges do not interfere, the two registers can be coalesced, a combined register RA3 can be utilized in instructions 82 and 84, resulting in a copy of RA3 to register RA3 in instruction 82, which can be easily eliminated. The result is that instruction 80 with the result in RA is replaced by instruction 86 which is identical except that its result is left in register R3. The result left in R3 can then be used correctly by the call to subroutine FOO in instruction 84.

FIG. 3 is a dataflow chart illustrating an example where COPY instructions cannot be eliminated by either COPY Propagation or register allocation. Register RA is defined in instruction 90. As with step 70, an ADD instruction is shown in instruction 90. However, this technique will work with other instructions. Subroutine FOO is called in instruction 92. This has the result of clobbering all the registers in the calling convention. This is followed by a copy of register RA to register R3 in instruction 94. Finally, register R3 is used in a call to BAR in instruction 96.

COPY Propagation fails with the FIG. 3 example for the same reason that it failed with the FIG. 2 example, which is that register R3 cannot be renamed, due to its being part of the calling convention. Register allocation fails in this example because the live range for register RA interferes with the live range for register R3. This is because the live range for register RA is between instructions 90 and 94 but the live range of R3 is not just between instructions 94 and 96, but also includes the call to subroutine FOO at instruction 92. This is because register R3 is clobbered by the calling convention in the call to subroutine FOO at instruction 92. Due to this interference between the live ranges of the two registers, register allocation cannot coalesce register R3 and RA.

It would be advantageous to be able to remove COPY instructions in instances where neither COPY Propagation nor Register Allocation is effective in removing such COPY instructions.

BRIEF DESCRIPTION OF THE DRAWINGS

A better understanding of the present invention can be obtained when the following detailed description is considered in conjunction with the following drawings, in which:

FIG. 3 illustrates, in flow chart form, instruction scheduling according to one embodiment of the present invention;

FIG. 4 illustrates, in data flow chart format, compiler optimization using instruction scheduling according to one embodiment of the present invention;

DETAILED DESCRIPTION

Figure 1:
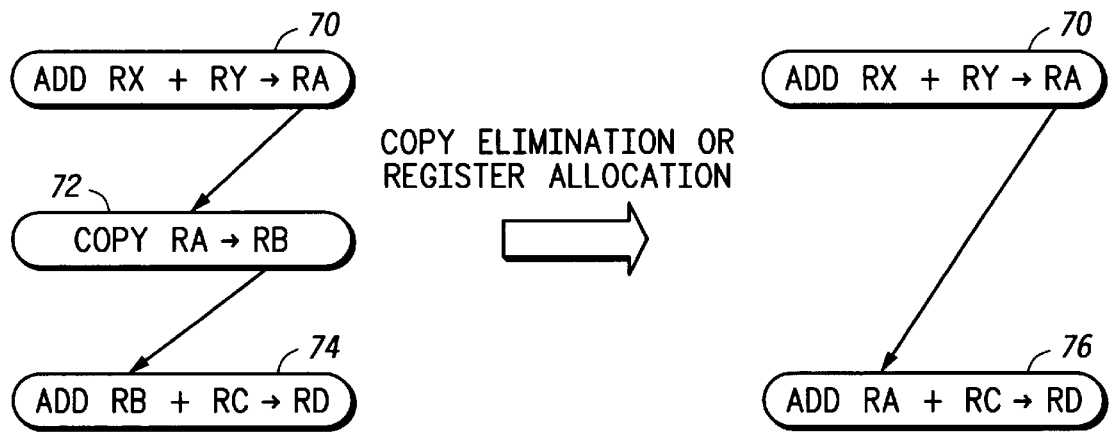
FIG. 1 illustrates, in data flow chart format, a prior art example of compiler optimization using COPY Propagation.
Figure 2:
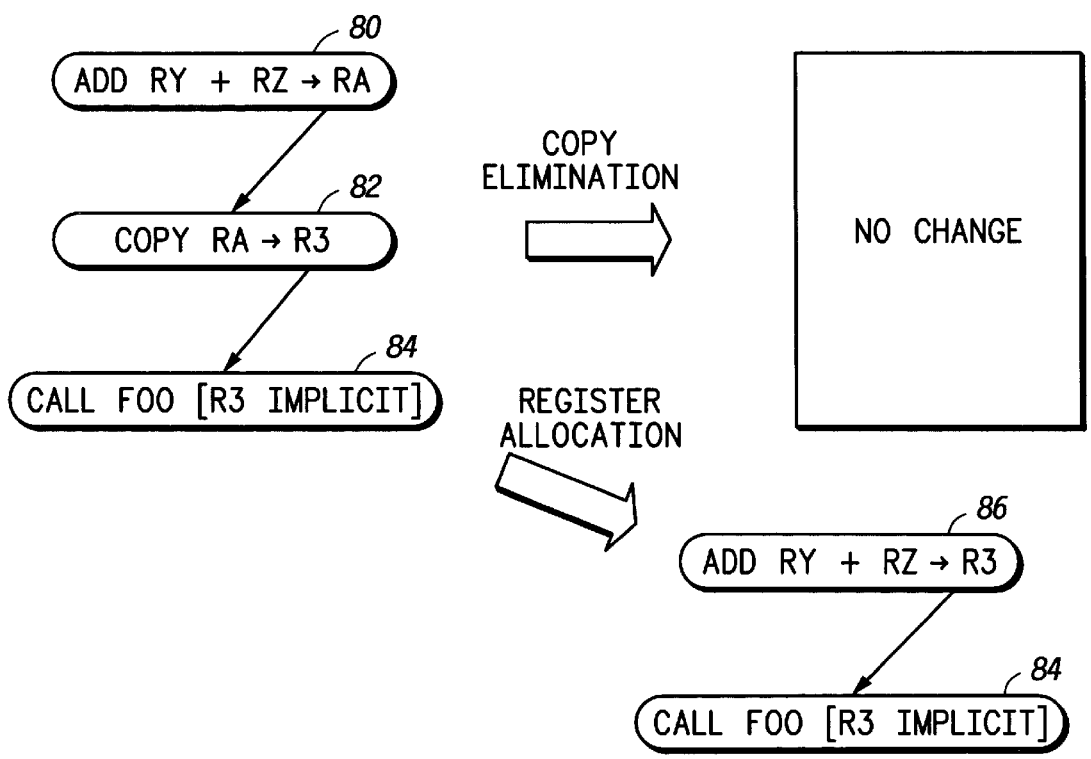
FIG. 2 illustrates, in data flow chart format, a prior art example of compiler optimization using register coalescing.

This invention provides a method for effectively eliminating COPY instructions in call-intensive codes by rearranging instructions. These COPY instructions would otherwise be required by the calling conventions. Removing the COPY instructions reduces code size, and therefore I-cache miss rate.

The method schedules instructions with the intent of removing COPY instructions. It can be used in conjunction with any prior scheduling technique. The method has three primary parts.

1. Build def-use chains.
2. Coalesce all COPY instructions creating an illegal or unschedulable program.
3. Schedule the instructions, preserving the def-use chains as much as possible.

Def-use chains represent program as directed graphs. Nodes in the graphs are program instructions. Arcs in the graphs go from the instruction defining some value to the instruction using that value. In the final programs each arc will be associated with a physical register. During scheduling, arcs may not be associated with a physical register; equivalently, arcs can be associated with virtual registers drawn from an infinite pool of registers. Either the defining instruction or the using instruction can require its value to be in a particular physical register. It is possible that both instructions require different physical registers. In this situation, a COPY instruction is required to be generated. Def-use chains are built using standard techniques for basic block schedulers.

Copy instructions are coalesced by combining a COPY instruction's input and output arcs. The final arc may require a particular physical register on the arc's head or tail. If the arc is unconstrained, then the COPY instruction is trivially removed. If the arc is constrained to a single register, then it may be possible to schedule the code so that the register is not clobbered between the defining instruction and the using instruction. If rescheduled, then the COPY instruction can be removed. If not, then the COPY instruction must remain. If both ends of the arc require different physical registers, a COPY instruction is still required.

Coalescing COPY instructions during scheduling is one key idea of this invention. Coalescing COPY instructions in a compiler is typically done either by the register allocater or by a separate compiler pass. In either case, another compiler pass is unable to rearrange instructions.

The remaining phase of the invention deals with the consequences of coalescing COPY instructions. A typical list scheduler is used. List schedulers maintain a list of "ready" instructions; instructions whose inputs have already been scheduled. The scheduler pulls the best instruction from a "ready list" containing the ready instructions using some heuristic, then schedules it. Scheduling an instruction typically makes more instructions ready. The process repeats until all instructions have been scheduled, and the ready list is empty.

The art of list scheduling involves selecting a good heuristic. The heuristic described herein is designed to produce a legal schedule if one is possible. The heuristic follows these basic steps:

1. Find the next subroutine CALL or end-of-block (using a simple linear scan).

2. Find the set of instructions that must be scheduled before this subroutine CALL due to data dependencies (by walking the def-use chains already present).
3. Schedule this set of instructions, then the subroutine CALL, then repeat until all instructions have been scheduled.

If the ready instruction selected to be scheduled next defines a register that is currently in use, then there is a conflict. Resolving the conflict usually requires a COPY instruction to be generated, where the value in use is copied into virtual register and the value's users are altered to reflect this. Since conflicts imply generation of COPY instructions, the heuristic tries to avoid conflicts. Scheduling the subset of ready instructions required by the next subroutine CALL is further refined by more heuristics:

1. Ready instructions defining virtual registers are scheduled before ones defining physical registers. Virtual registers never conflict.
2. Instructions that do not conflict and use many physical registers are selected next. When the last use of a physical register is scheduled, that register no longer causes conflicts.
3. After all instructions are scheduled, a separate pass can reschedule the instructions with the intent of reducing latency.

FIG. 4 is a flow chart that illustrates removing COPY instructions utilizing rescheduling. First, Def-Use chains are built, step 52. Def-Use chains are described earlier and are built using standard techniques. Next, COPY instructions are coalesced, step 54, as described earlier. Next a list of instructions whose inputs are all available is generated. This ready list is built in step 56.

A loop is entered in step 58. While the ready list is not empty, the loop iterates. When the ready list is finally empty, the loop exits and the method is done. Within the loop, an instruction is first selected from the ready list, in step 62. In step 64, if the selected instruction conflicts with any values that are currently live, then the conflict is resolved. A conflict occurs if a selected instructions writes to a physical register which currently holds a value needed by some other instruction. Resolving such a conflict requires inserting a COPY instructions to move the value in the physical register to a virtual register. Next the selected instruction is scheduled in the basic block, step 66. Scheduling an instruction makes its inputs available for other instructions. If any of these other instructions now have all their inputs available, they are added to the ready list, step 68. Finally the loop repeats starting at step 58.

Figure 5:
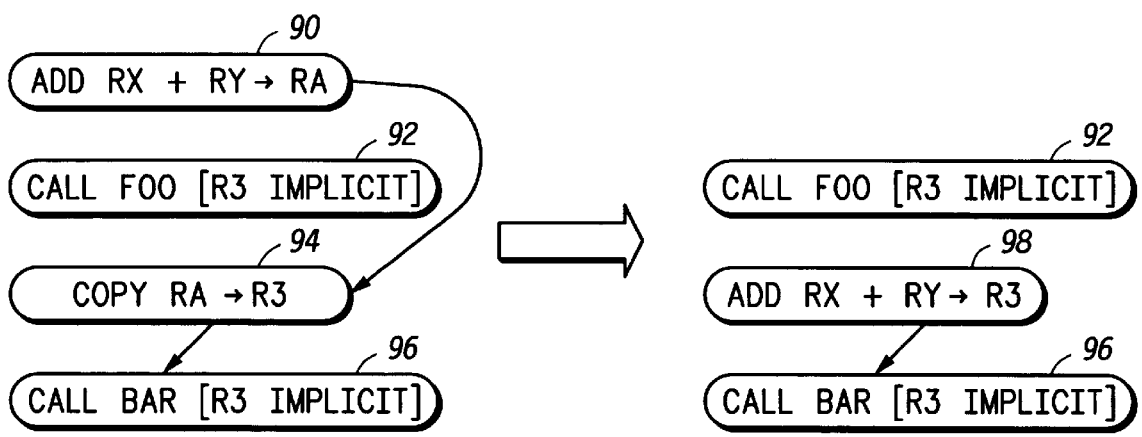
FIG. 5 illustrates, in block diagram form, a computer system according to one embodiment of the present invention.

FIG. 5 is a dataflow chart that illustrates the method shown in FIG. 4 applied to the example shown in FIG. 3. In this example, the Def-Use chains are shown explicitly by arcs. Coalescing COPY instructions in step 54 replaces register RA in instruction 90 with the coalesced register R3, and the COPY instruction 94 is removed. The result is shown on the right hand side of FIG. 5. Next, instructions 92 and 98 are ready and placed on the ready list, step 56.

Since the ready list is not empty, step 58, a next instruction is selected. Different methods can be used to select the next instruction. Preferably the following technique is used. Instruction 98 is not needed by the CALL instruction, 92, and it defines a physical register R3. Scheduling instruction 98 next would lead to a conflict with the next call. Instead, instruction 92 is scheduled. The ready list will then contain only instruction 98, and the method repeats the loop starting at step 58.

Instruction 98 now must be scheduled (since it is the only instruction on the ready list). Since it does not conflict, no conflict resolution is done. Instruction 98 is then scheduled and instruction 96 is placed on the ready list. Finally instruction 96 is scheduled, the ready list runs dry and the method is done.

This method illustrates a technique for removing COPY instructions. The actual execution time of COPY instructions is quite small for modern microprocessors. However, in call-intensive programs, COPY instructions represent a significant percentage of all instructions and they use valuable I-cache space. I-cache misses are a significant portion of the running time of these large programs, so reducing code size reduces running time. Traditional techniques for removing COPY instructions are limited to register selection (the Copy Elimination or Register Allocation techniques described above) and do not attempt code motion. Traditional code motion techniques do not attempt to remove COPY instructions and miss many opportunities to do so.

Figure 6:
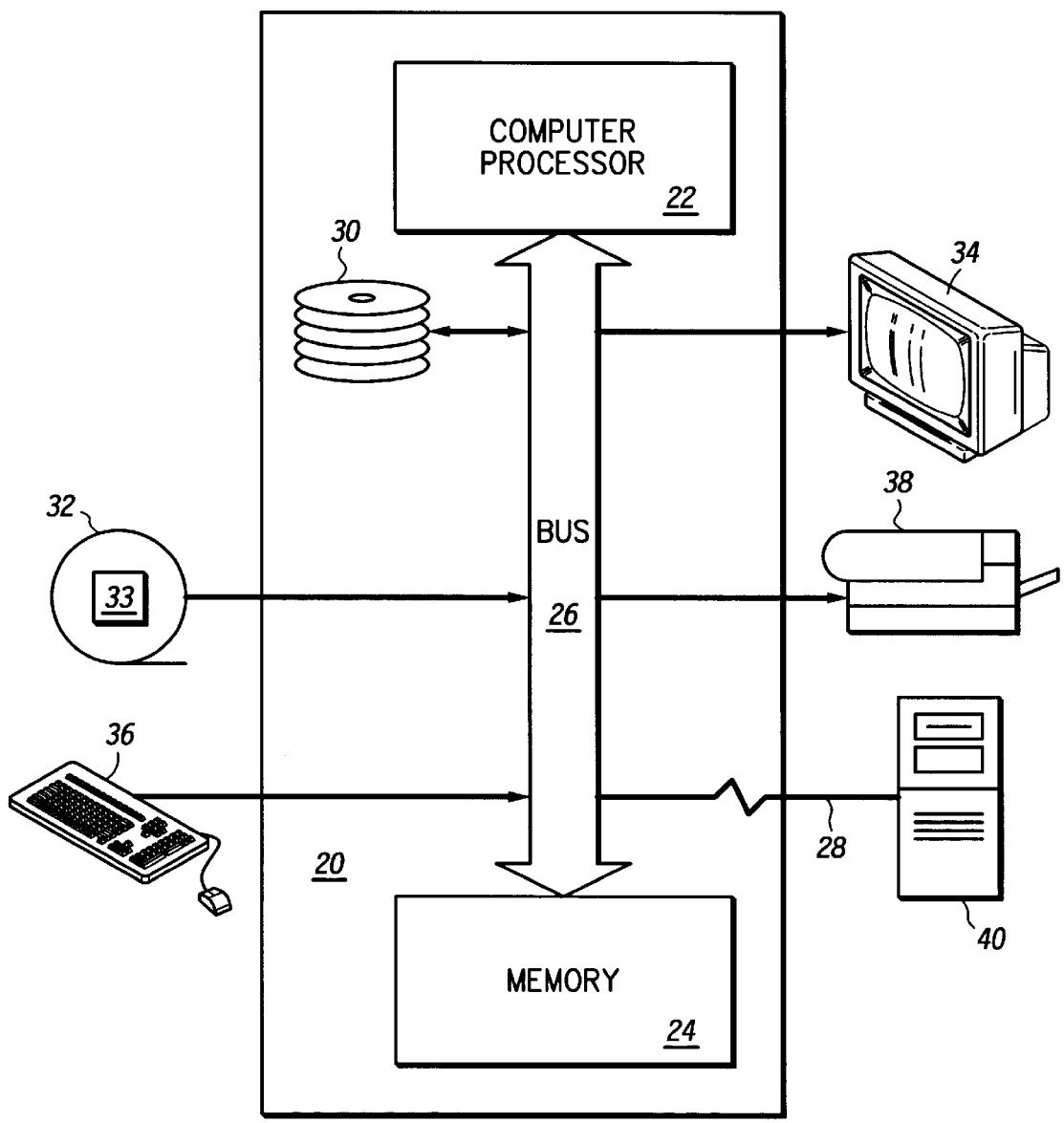
FIG. 6 is a block diagram showing a General Purpose Computer used to implement the present invention.

FIG. 6 is a block diagram showing a General Purpose Computer 20. The General Purpose Computer 20 has a Computer Processor 22, and Memory 24, connected by a Bus 26. Memory 24 includes relatively high speed machine readable media such as DRAM, SRAM, ROM, FLASH, EEPROM, and bubble memory. Also connected to the Bus are Secondary Storage 30, External Storage 32, output devices such as a monitor 34, input devices such as a keyboard (with mouse) 36, and printers 38. Secondary Storage 30 includes machine readable media such as hard disk drives, magnetic drum, and bubble memory. External Storage 32 includes machine readable media such as floppy disks, removable hard drives, magnetic tape, CD-ROM, and even other computers, possibly connected via a communications line. The distinction drawn here between Secondary Storage 30 and External Storage 32 is primarily for convenience in describing the invention. As such, it should be appreciated that there is substantial functional overlap between these elements. Executable versions of computer software 33, such as a compiler and user programs generated by such a compiler can be read from the External Storage 32 and loaded for execution directly into the Memory 34, or stored on the Secondary Storage 30 prior to loading into Memory 34 and execution.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method for scheduling instructions for a first portion of a computer program, the first portion of the computer program having a plurality of instructions, the first portion of the computer program having a first code size, the method comprising the steps of:
    (a) building a def-use chain for the portion of the computer program, wherein the def-use chain defines an input arc and an output arc for each COPY instruction;
    (b) coalescing a first COPY instruction, where the first COPY instruction is part of the portion of the computer program, wherein coalescing the first COPY instruction combines the input and output arcs of the first COPY instruction;
    (c) listing a first subset of the first portion in a ready list, the ready list for listing instructions available for scheduling;

(d) selecting a next instruction from the first subset listed in the ready list;

(e) determining if the next instruction has at least one liveness conflict;

(f) resolving the at least one liveness conflict, if the next instruction has at least one liveness conflict;

(g) scheduling the next instruction; and (h) updating the ready list after completing step (g).

2. The method of claim 1 wherein step (d) comprises the substeps of:

1) selecting instructions that do not conflict prior to selecting instructions that do conflict.

3. The method of claim 2 wherein substep (1) of step (d) comprises:

scheduling instructions in an order which maximizes concurrent execution of instructions.

4. The method of claim 2 wherein substep (1) of step (d) comprises:

selecting instructions that do not define physical registers prior to selecting instructions that define physical registers.

5. The method of claim 2, wherein substep (1) of step (d) comprises:

selecting instructions that use physical registers, where instructions are selected according to the number of physical registers used.

6. The method of claim 1, wherein the method further comprises the step of:

iteratively repeating steps (d), (e), (f), (g), and (h) as a first loop until the ready list is empty.

7. The method of claim 6, wherein when the ready list is empty the portion of the computer program has a second code size, wherein the second code size is smaller than the first code size.

8. The method of claim 1 repeating steps (a), (b), (c), (d), (e), (f), (g), and (h) as a second loop.

9. The method of claim 1 wherein step (b) is iteratively repeated for all COPY instructions which do not copy a first physical register to a second physical register.

10. The method of claim 1, wherein the first portion is a basic block.

11. The method of claim 1, wherein step (f) comprises:

inserting a second COPY instruction to move a value in a physical register to a virtual register.

12. A computer program compiler for translating human readable computer program code into computer readable program code, the computer program compiler comprising:

a first set of instructions which coalesces COPY instructions in a computer program;

a second set of instructions which lists instructions of the computer program in a ready list;

a third set of instructions which selects a next instruction from the ready list;

a fourth set of instructions which determines liveness conflicts for the next instruction;

a fifth set of instructions which resolves liveness conflicts for the next instruction;

a sixth set of instructions which schedules the next instruction, wherein instructions that do not conflict are selected prior to selecting instructions that do conflict, wherein instructions that do not define physical registers are selected prior to selecting instructions that define physical registers; and a seventh set of instructions which determines if the ready list is empty.

13. The computer program compiler of claim 12, wherein the first set of instructions includes steps for coalescing a second COPY instruction in the computer program.

14. A computer program product encoded in a computer readable medium, the computer program product comprising at least a first plurality of instructions executable on a computer system, said computer program product being compiled according to a method for scheduling instructions, the method comprising:

(a) building a def-use chain for the portion of the computer program, wherein the def-use chain defines an input arc and an output arc for each COPY instruction;

(b) coalescing a first COPY instruction, where the first COPY instruction is part of the portion of the computer program, wherein coalescing the first COPY instruction combines the input and output arcs of the first COPY instruction;

(c) listing a first subset of the instructions in a ready list, the ready list for listing instructions available for scheduling;

(d) selecting a next instruction from the first subset listed in the ready list;

(e) determining if the next instruction has at least one liveness conflict;

(f) resolving the at least one liveness conflict, if the next instruction has at least one liveness conflict;

(g) scheduling the next instruction; and (h) updating the ready list after completing step (g).

15. The computer program product of claim 14, wherein:

the computer readable medium is a floppy disk.

16. The computer program product of claim 14:

wherein the computer readable medium is a compact disk.

17. A computer program product encoded in a computer readable medium, the computer program product being compiled by a computer program compiler, the computer program compiler for translating human readable computer program code into computer readable code, the compiler, the computer program compiler, comprising:

a first set of instructions which coalesces a first COPY instruction in the computer program product;

a second set of instructions which lists listing instructions in a ready list;

a third set of instructions which selects a next instruction from the ready list;

a fourth set of instructions which determines liveness conflicts for the next instruction;

a fifth set of instructions which resolves liveness conflicts for the next instruction;

a sixth set of instructions which schedules instructions in the ready list, wherein instructions that do not conflict are scheduled prior to scheduling instructions that do conflict, wherein instructions that do not define physical registers are scheduled prior to scheduling instructions that define physical registers; and a seventh set of instructions which determines if the ready list is empty.

18. The computer program product of claim 17, wherein the computer readable medium is a memory on a data processor.

19. The computer program product of claim 17, wherein the computer readable medium is a memory storage unit.

* * * * *